United States Patent
Subramanian et al.

(10) Patent No.: US 11,430,337 B2
(45) Date of Patent: Aug. 30, 2022

(54) POSITIONING SYSTEM FOR PAVING MACHINES

(71) Applicant: Caterpillar Inc., Peoria, IL (US)

(72) Inventors: Gautham Subramanian, Peoria, IL (US); Jacob McAlpine, Otsego, MN (US)

(73) Assignee: Caterpillar Inc., Peoria, IL (US)

( * ) Notice: Subject to any disclaimer, the term of this patent is extended or adjusted under 35 U.S.C. 154(b) by 298 days.

(21) Appl. No.: 16/598,594

(22) Filed: Oct. 10, 2019

(65) Prior Publication Data

US 2021/0110719 A1   Apr. 15, 2021

(51) Int. Cl.

| | |
|---|---|
| *G08G 1/00* | (2006.01) |
| *H04W 4/029* | (2018.01) |
| *E01C 19/00* | (2006.01) |
| *E01C 19/10* | (2006.01) |
| *E01C 23/07* | (2006.01) |
| *H04W 4/021* | (2018.01) |

(52) U.S. Cl.
CPC ........... *G08G 1/207* (2013.01); *E01C 19/004* (2013.01); *E01C 19/1063* (2013.01); *E01C 23/07* (2013.01); *G08G 1/22* (2013.01); *H04W 4/021* (2013.01); *H04W 4/029* (2018.02)

(58) Field of Classification Search
CPC ......... G08G 1/207; G08G 1/22; H04W 4/029; H04W 4/021; E01C 19/004; E01C 19/1063; E01C 23/07
See application file for complete search history.

(56) References Cited

U.S. PATENT DOCUMENTS

| | | | |
|---|---|---|---|
| 9,066,464 B2* | 6/2015 | Schmidt | G05D 1/0274 |
| 10,072,388 B2 | 9/2018 | Kadaba | |
| 10,853,748 B2* | 12/2020 | Ha | G06Q 50/30 |
| 2005/0159883 A1 | 7/2005 | Humphries et al. | |

(Continued)

OTHER PUBLICATIONS

Lingguang Song et al: "Adaptive real-time tracking and simulation of heavy construction operations for look-ahead scheduling", Automation in Construction, Elsevier, Amsterdam, NL, vol. 27, May 9, 2012 (May 9, 2012), pp. 32-39, XP028401396, ISSN: 0926-5805, DOI: 10.1018/J.Autcon.2012.05.007 [retrieved on May 14, 2012] the whole document.

*Primary Examiner* — Aniss Chad
*Assistant Examiner* — Christine Nguyen Huynh
(74) *Attorney, Agent, or Firm* — Harrity & Harrity LLP (57) ABSTRACT

A paving machine including a frame, a hopper assembly, and a control unit is disclosed. The control unit may be configured to determine a location of the paving machine, determine a heading and a travel speed of the paving machine, and generate a non-circular geofence corresponding to the paving machine. The non-circular geofence may have an anchor point that is disposed at the location of the paving machine, and may be positioned and oriented based on the heading and the travel speed of the paving machine. The control unit may be configured to determine a location of a supply machine relative to the paving machine, and determine a state of the supply machine based on a comparison between the location of the supply machine and the non-circular geofence. The control unit may be configured to cause an action to be performed based on the state of the supply machine.

20 Claims, 6 Drawing Sheets

(56) References Cited

U.S. PATENT DOCUMENTS

| | | | |
|---|---|---|---|
| 2010/0312599 A1* | 12/2010 | Durst | G06Q 50/02 |
| | | | 701/123 |
| 2013/0290062 A1 | 10/2013 | Patel | |
| 2014/0236686 A1 | 8/2014 | Grush et al. | |
| 2016/0222602 A1* | 8/2016 | Downing | G01C 21/36 |
| 2016/0325675 A1 | 11/2016 | Bharwani | |
| 2017/0205814 A1* | 7/2017 | Marsolek | G07C 5/0825 |
| 2019/0182627 A1 | 6/2019 | Thoresen et al. | |
| 2019/0188620 A1 | 6/2019 | Marsolek | |

* cited by examiner

| Productivity Data | | | |
|---|---|---|---|
| Trucks in Queue | 4 | Tons Paved | 438 Tons |
| Trucks in Transit | 7 | Tons in Transit | 183.4 Tons |
| | | Tons Remaining | 880 Tons |
| Next Truck | | Time Remaining | 5 Hours |
| ETA | 6 Minutes | Operation Progress | 66% |
| Load Volume | 44.22 Tons | ... | |
| | | | |
| Following Truck | | | |
| ETA | 11 Minutes | | |
| Load Volume | 44.38 Tons | | |
| ... | | | |

FIG. 4D

POSITIONING SYSTEM FOR PAVING MACHINES

TECHNICAL FIELD

The present disclosure relates generally to paving operations and, for example, to a positioning system for paving machines.

BACKGROUND

Paving machines are used to spread and compact a mat of paving material evenly over a desired work surface. Paving machines are regularly used to pave roads, parking lots, and other areas where a smooth durable surface is desired. A paving machine generally includes a hopper assembly to receive the paving material (e.g., asphalt and/or another bituminous aggregate material) from a supply machine (e.g., a haul truck, a dump truck, a windrow elevator, a material transfer vehicle, and/or the like), and a conveyor system to transfer the paving material rearwardly from the hopper assembly for discharge onto the work surface. A screw auger may be used to spread the paving material transversely across the work surface in front of a screed assembly. The screed assembly smoothes and partially compacts the paving material, leaving a mat of uniform depth and smoothness. During a paving operation, a compactor machine typically follows the paving machine to further compact the mat laid by the paving machine. Furthermore, one or more supply machines may travel between the paving machine and a material production plant to provide the paving machine with a constant supply of fresh paving material.

A rate at which paving material is delivered to the paving machine by supply machines may have a significant impact on a paving operation. If the rate of delivery is too slow, the paving machine may run out of paving material during the paving operation. The paving machine may be forced to temporarily halt the paving operation, which can introduce unwanted delays and potential inconsistencies in the mat laid by the paving machine. If the rate of delivery is too fast, supply machines may spend more time in a loading queue waiting to unload, which can cause fresh paving material to cool and prematurely cure. In some cases, a positioning system may be used to facilitate a paving operation. For example, a positioning system may track a location of a supply machine relative to a paving machine in order to monitor the rate of delivery of paving material to the paving machine. In some cases, the positioning system may generate a virtual geofence around the paving machine to detect an event (e.g., when a supply machine is in proximity to the paving machine and available to deliver fresh paving material). By tracking when supply machines enter and exit the geofence, the positioning system may aid operators in managing the rate at which supply machines supply the paving machine with paving material.

Figure 1:
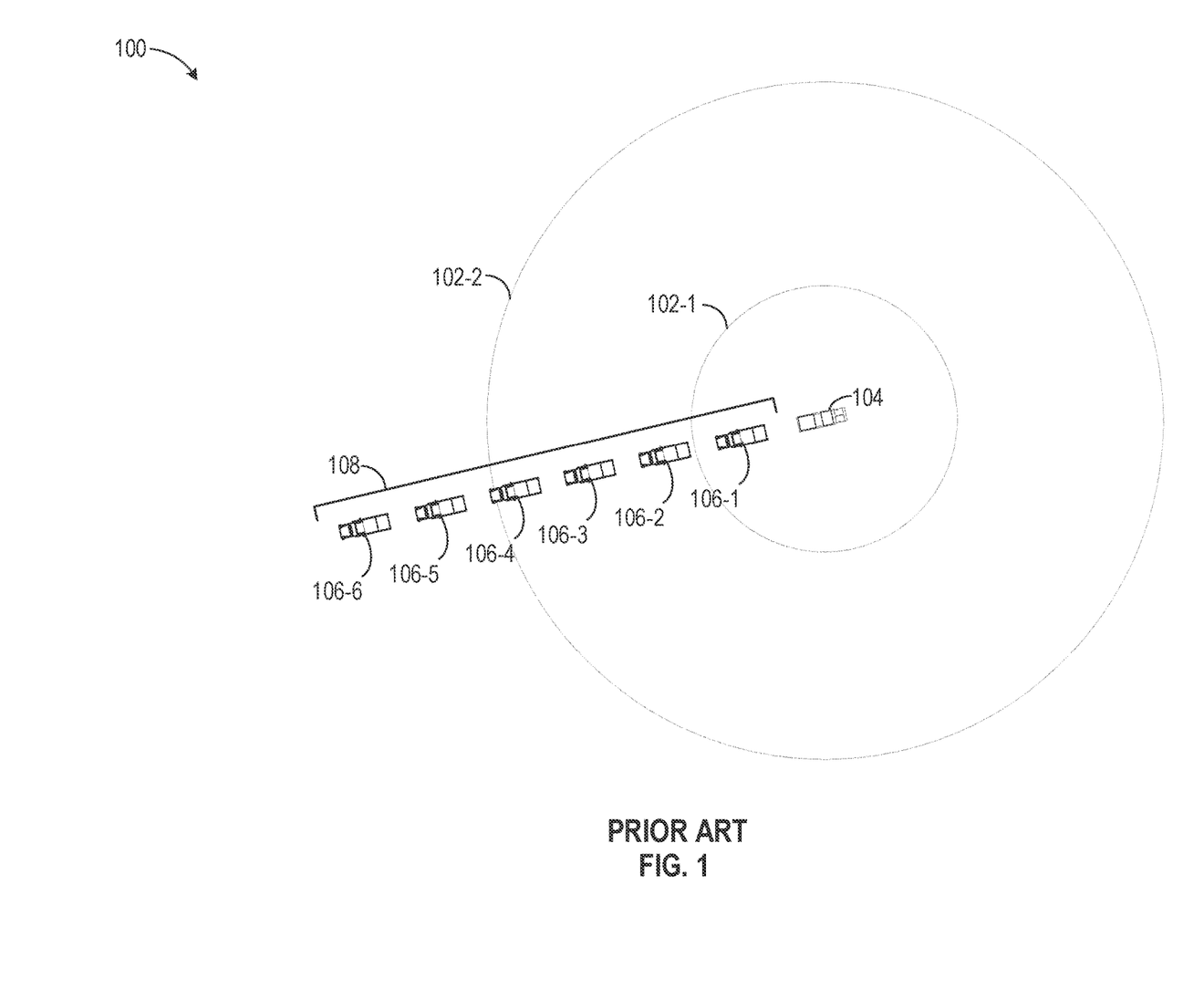
FIG. 1 is a diagram of a prior art implementation of a positioning system for paving machines.

In some cases, a geofence used by a positioning system may provide limited information. As shown in a prior art implementation 100 of FIG. 1, geofences 102-1 and 102-2 are typically circular in shape, centered at a location of a paving machine 104, and arranged to identify when one of supply machines 106-1, 106-2, 106-3, 106-4, 106-5, and 106-6 is in a loading queue 108 relative to paving machine 104. In some cases, a first geofence 102-1 may detect when supply machines 106-1, 106-2, 106-3, 106-4, 106-5, and 106-6 enter an area designated as the jobsite and trigger a jobsite entry event, and a second geofence 102-2 may detect when supply machines 106-1, 106-2, 106-3, 106-4, 106-5, and 106-6 enter an area designated as the worksite and trigger a worksite entry event. However, the shape and size of circular geofence 102 may limit the number of supply machines 106 the positioning system can identify. As shown, first geofence 102-1 may only be able to detect a first supply machine 106-1 within the jobsite, and second geofence 102-2 may only be able to detect a second supply machine 106-2, a third supply machine 106-3, and a fourth supply machine 106-4 within the worksite. Prior art implementation 100 may be unable to detect a fifth supply machine 106-5, a sixth supply machine 106-6, and/or another supply machine 106 that may be in loading queue 108.

Accordingly, a circular geofence may be unable to detect events that may otherwise be useful in managing a paving operation. As one example, an operator of a paving operation may want to account for all supply machines that are in the loading queue so that the operator can more accurately track the respective wait times of the supply machines. With more accurate wait times, the operator may be able to more accurately monitor for premature curing of the paving material. Although enlarging a circumference of the circular geofence may aid in identifying more events (e.g., relating to entry and exit of supply machines relative to the geofence), information provided using a larger circular geofence may be less granular, less accurate, and/or require additional processing. In some cases, a circular geofence may falsely identify irrelevant events (e.g., entry or exit of a supply machine in a direction unrelated to a rate of delivery of paving material). Information provided via such geofences may be inaccurate, misleading, and unnecessarily consume computational and/or networking resources that may otherwise be used for other processes.

One solution for using geofences to measure productivity of a machine at a worksite is disclosed in U.S. Publication No. 2010/0312599, by Durst, filed on Jun. 8, 2009 ("the '599 publication"). The '599 publication discloses a system and method for measuring the productivity of a machine. The '599 publication discloses a digital map that represents a worksite or at least a portion of a worksite. The '599 publication discloses a geofence on the digital map, where the geofence represents a subsection of an area on the digital map. The '599 publication discloses that a number of times that a particular machine left a geofence area and then subsequently entered a geofence area may be measured to determine the productivity of the machine. However, the '599 publication does not disclose a geofence that is associated with a mobile machine (e.g., a paving machine) that can change direction or heading. Furthermore, the '599 publication does not disclose a geofence that incorporates directional or heading information of an associated paving machine in a manner configured to identify events relative to the paving machine (e.g., entry or exit of a supply machine relative to a hopper assembly of the paving machine).

A positioning system of the present disclosure overcomes one or more shortcomings set forth above.

SUMMARY

According to some implementations, a method may include receiving, by a device, location data corresponding to a location of a paving machine; determining, by the device, a heading and a travel speed of the paving machine based on the location data; generating, by the device, a non-circular geofence corresponding to an area associated with the paving machine, the non-circular geofence having an anchor point that is disposed at the location of the paving machine, and the non-circular geofence being positioned and oriented relative to the paving machine based on the heading and the travel speed of the paving machine; receiving, by the device, location data corresponding to a location of a supply machine relative to the paving machine; determining, by the device, a state of the supply machine based on a comparison between the location of the supply machine and the non-circular geofence; and causing, by the device, an action to be performed based on the state of the supply machine.

According to some implementations, a device may include one or more memories; and one or more processors, communicatively coupled to the one or more memories, configured to determine a location of a paving machine; determine a heading of the paving machine; generate a non-circular geofence corresponding to the paving machine, the non-circular geofence having an anchor point that is disposed at the location of the paving machine, and the non-circular geofence extending from the anchor point in a direction that is based on the heading of the paving machine; determine a location of a supply machine relative to the paving machine; determine a state of the supply machine based on a comparison between the location of the supply machine and the non-circular geofence; and cause an action to be performed based on the state of the supply machine.

According to some implementations, a work machine may include a frame; a hopper assembly coupled to the frame; and a control unit configured to: determine a location of the paving machine, determine a heading and a travel speed of the paving machine, generate a non-circular geofence corresponding to the paving machine, the non-circular geofence having an anchor point that is disposed at the location of the paving machine, and the non-circular geofence being positioned and oriented relative to the paving machine based on the heading and the travel speed of the paving machine, determine a location of a supply machine relative to the paving machine, determine a state of the supply machine based on a comparison between the location of the supply machine and the non-circular geofence, and cause an action to be performed based on the state of the supply machine.

DETAILED DESCRIPTION

Figure 2:
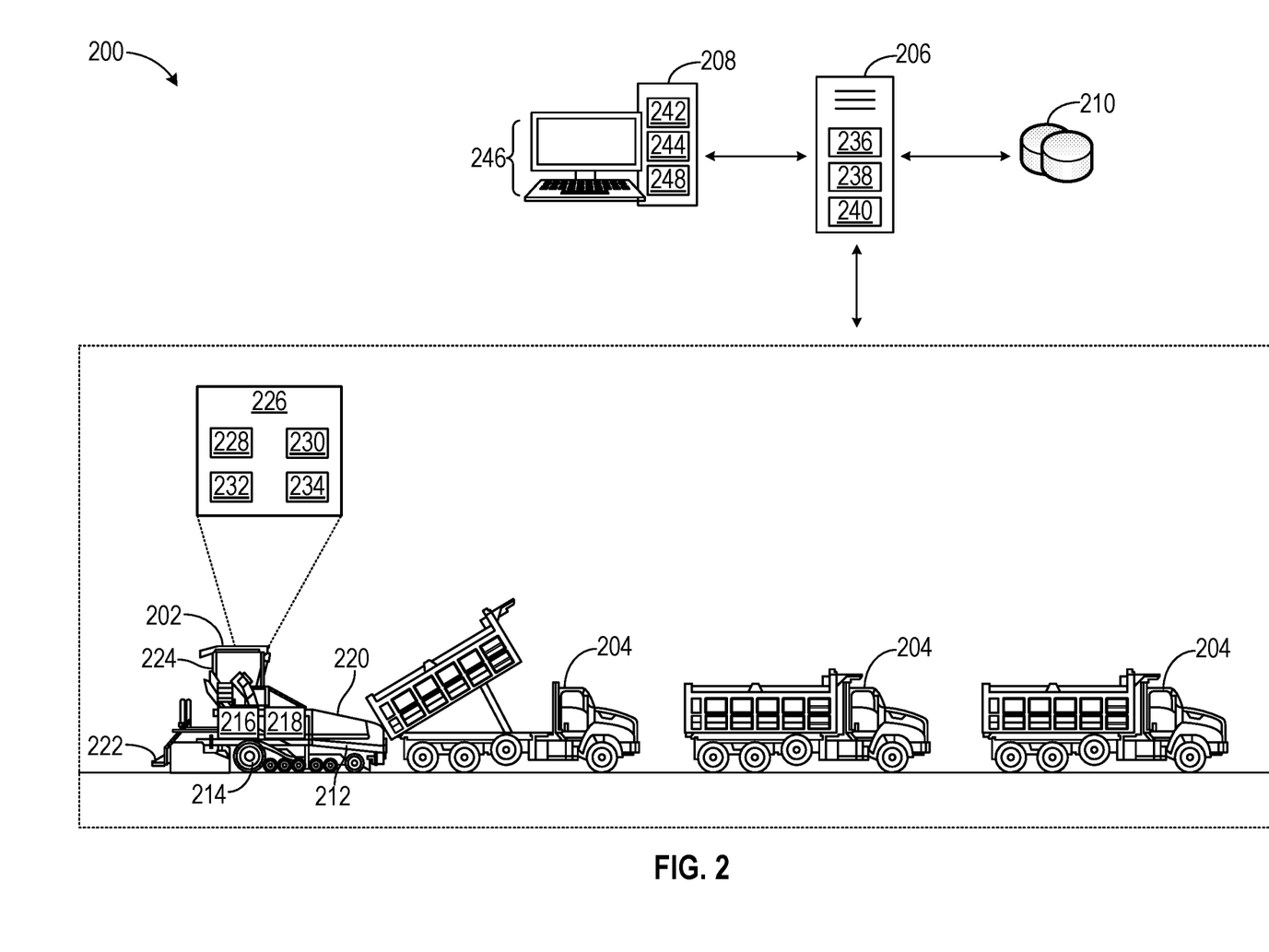
FIG. 2 is a diagram of an example positioning system for paving machines described herein.

FIG. 2 is a diagram of an example positioning system 200 described herein. As shown in FIG. 2, positioning system 200 may include a paving machine 202, a supply machine 204, a management platform 206, a control station 208, a network storage device 210, and/or another device configured to facilitate a paving operation being performed at a worksite. Positioning system 200 may be used to track a progress of the paving operation relative to a site plan. Paving machine 202 may be configured to receive paving material (e.g., asphalt and/or another bituminous aggregate material) from supply machine 204 (e.g., a haul truck, a dump truck, a windrow elevator, a material transfer vehicle, and/or the like), and pave a work surface with the paving material according to the site plan (e.g., according to a target mat thickness, a target mat width, a target mat length, and/or another specification of the paving operation to be performed). One or more supply machines 204 may retrieve fresh paving material from a material production plant, and align along a loading queue relative to paving machine 202 to supply paving machine 202 with the paving material. An operator may coordinate trips made by supply machines 204 to provide paving machine 202 with a constant supply of paving material with minimal stoppage and delay.

In some implementations, positioning system 200 may provide and/or support a monitoring service that receives information relating to a paving operation at a worksite, determines a state of the paving operation, and provides a progress of the paving operation to an operator of the worksite. In some examples, positioning system 200 may provide information relating to the progress of the paving operation in a form of a digital model (e.g., a two-dimensional digital model and/or a three-dimensional digital model) of the worksite. The digital model may be generated using a combination of image data, map data, and/or productivity data (e.g., provided by paving machine 202, supply machine 204, management platform 206, control station 208, and/or network storage device 210) that are updated intermittently, periodically, and/or continuously in real-time. The monitoring service and/or information provided by the monitoring service may be made accessible to a local operator of paving machine 202, a local operator of supply machine 204, and/or a subscriber to the monitoring service (e.g., a remote operator, a site foreman, a supervisor, and/or the like) via control station 208 (e.g., a mobile device, a computer, and/or the like).

In some implementations, positioning system 200 may include multiple paving machines 202, multiple supply machines 204, and/or multiple control stations 208 that interact with management platform 206 and/or network storage device 210. In some examples, positioning system 200 may include multiple management platforms 206 and/or multiple network storage devices 210 that interact with paving machine 202, supply machine 204, and/or control station 208. Positioning system 200 may be used with a manually operated paving machine 202 and/or supply machine 204, and/or an autonomously or a semi-autonomously operated paving machine 202 and/or supply machine 204. For example, positioning system 200 may be used to guide, navigate, and/or control paving machine 202 and/or supply machine 204 based on location data of paving machine 202 and/or supply machine 204, coordinate data associated with a worksite, coordinate data associated with a site plan, and/or the like. In some examples, paving machine 202 and/or supply machine 204 may receive guidance, navigation, and/or control information from a local operator, from a remote operator via control station 208, and/or from another device of positioning system 200.

As further shown in FIG. 2, paving machine 202 includes a frame 212, traction elements 214, an engine 216, a generator 218, a hopper assembly 220, a screed assembly 222, an operator cab 224, and a control unit 226. Traction elements 214 may include wheels or tracks that are coupled to frame 212 and driven by engine 216. Engine 216 may include a diesel engine, a gasoline engine, a natural gas engine, a hybrid engine, an electric motor, and/or another power source configured to drive traction elements 214.

Generator 218 may be coupled to engine 216 and configured to supply electrical power to hopper assembly 220, screed assembly 222, and/or control unit 226. Hopper assembly 220 may be coupled to frame 212 and configured to transfer paving material supplied by supply machine 204 to screed assembly 222. Screed assembly 222 may be coupled to frame 212 and configured to distribute and compact the paving material onto a work surface as a substantially uniform mat of a desired thickness and a desired width. Operator cab 224 may be coupled to frame 212 and configured to support an operator of paving machine 202 and include one or more components that enable an operator to control an operation of paving machine 202.

Control unit 226 includes a processor 228, a memory 230, a user interface 232, and a communication device 234. Processor 228 is implemented in hardware, firmware, and/or a combination of hardware and software capable of being programmed to perform a function associated with paving machine 202 and/or positioning system 200. Memory 230 includes a random-access memory (RAM), a read only memory (ROM), and/or another type of dynamic or static storage device that stores information and/or instructions to be performed by processor 228. User interface 232 includes an input device and an output device. The input device may enable an operator of paving machine 202 to specify an instruction, a command, and/or another operating parameter for operating paving machine 202. The output device may enable an operator of paving machine 202 to track a location of paving machine 202 and/or supply machine 204, track a location of supply machine 204 relative to the worksite and/or paving machine 202, monitor a state of supply machine 204, track a progress of a paving operation relative to a site plan, access an event and/or a notification associated with the paving operation, and/or the like.

Communication device 234 includes a local area network (LAN) component (e.g., an Ethernet component), a wireless local area network (WLAN) component (e.g., a Wi-Fi component), a radio frequency (RF) communication component (e.g., a Bluetooth component), a positioning component (e.g., a global positioning system (GPS) component, a global navigation satellite system (GNSS) component), and/or the like. Communication device 234 may enable communication with supply machine 204, management platform 206, control station 208, and/or network storage device 210. For example, communication device 234 may enable processor 228 to receive and/or transmit location data corresponding to a location of paving machine 202 relative to a worksite and/or supply machine 204, and/or location data corresponding to a location of supply machine 204 relative to the worksite and/or paving machine 202. In some examples, communication device 234 may enable processor 228 to receive and/or transmit information relating to a state of supply machine 204, a site plan, a progress of a paving operation relative to a site plan, an event and/or a notification associated with the paving operation, and/or the like. Communication device 234 may enable processor 228 to communicate with supply machine 204, control station 208, and/or network storage device 210 directly and/or indirectly via management platform 206.

As further shown in FIG. 2, management platform 206 includes a processor 236, a memory 238, and a communication device 240. Processor 236 is implemented in hardware, firmware, and/or a combination of hardware and software capable of being programmed to perform a function associated with paving machine 202 and/or positioning system 200. Memory 238 includes a RAM, a ROM, and/or another type of dynamic or static storage device that stores information and/or instructions to be performed by processor 236. Communication device 240 includes a LAN component, a WLAN component, an RF communication component, a positioning component, and/or the like. Communication device 240 may enable processor 236 to receive and/or transmit information relating to a location of paving machine 202, a location of supply machine 204, a state of supply machine 204, a site plan, a progress of a paving operation relative to a site plan, an event and/or a notification associated with the paving operation, and/or the like. In some examples, communication device 240 may enable information to be exchanged between paving machine 202, supply machine 204, control station 208, and/or network storage device 210.

As further shown in FIG. 2, control station 208 includes a processor 242, a memory 244, a user interface 246, and a communication device 248. Processor 242 is implemented in hardware, firmware, and/or a combination of hardware and software capable of being programmed to perform a function associated with paving machine 202 and/or positioning system 200. Memory 244 includes a RAM, a ROM, and/or another type of dynamic or static storage device that stores information and/or instructions to be performed by processor 242. User interface 246 includes an input device and an output device. The input device may enable a remote operator of paving machine 202 to specify an instruction, a command, and/or another operating parameter for operating paving machine 202. The output device may enable a remote operator of paving machine 202 to track a location of paving machine 202 relative to a worksite and/or a supply machine 204, track a location of supply machine 204 relative to the worksite and/or paving machine 202, monitor a state of supply machine 204, track a progress of a paving operation relative to a site plan, access an event and/or a notification associated with the paving operation, and/or the like.

Communication device 248 includes a LAN component, a WLAN component, an RF communication component, a positioning component, and/or the like. Communication device 248 may enable communication with paving machine 202, supply machine 204, management platform 206, and/or network storage device 210. For example, communication device 248 may enable processor 242 to receive and/or transmit information relating to a location of paving machine 202 relative to a worksite and/or supply machine 204, a location of supply machine 204 relative to the worksite and/or paving machine 202, a state of supply machine 204, a site plan, a progress of a paving operation relative to a site plan, an event and/or a notification associated with the paving operation, and/or the like. In some examples, communication device 248 may enable processor 242 to communicate with paving machine 202, supply machine 204, and/or network storage device 210 directly and/or indirectly via management platform 206. Additionally, or alternatively, communication device 248 may enable control station 208 to serve as a user interface of management platform 206.

As further shown in FIG. 2, network storage device 210 includes one or more devices capable of storing, processing, and/or routing information. Network storage device 210 may include, for example, a server device, a device that stores a data structure, a device in a cloud computing environment or a data center, and/or the like. In some examples, network storage device 210 may include a communication interface that allows network storage device 210 to receive information from and/or transmit information to paving machine 202, supply machine 204, management platform 206, control station 208, and/or another device associated with positioning system 200. In some examples, network storage device 210 may store information relating to paving machine 202 and/or positioning system 200. For example, network storage device 210 may be used to store information relating to a location of paving machine 202, a location of supply machine 204, a state of supply machine 204, a site plan, a progress of a paving operation relative to a site plan, an event and/or a notification associated with the paving operation, and/or the like, and enable paving machine 202, supply machine 204, management platform 206, and/or control station 208 to access the information.

As indicated above, FIG. 2 is provided as an example. Other examples may differ from what is described in connection with FIG. 2.

Figure 3A:
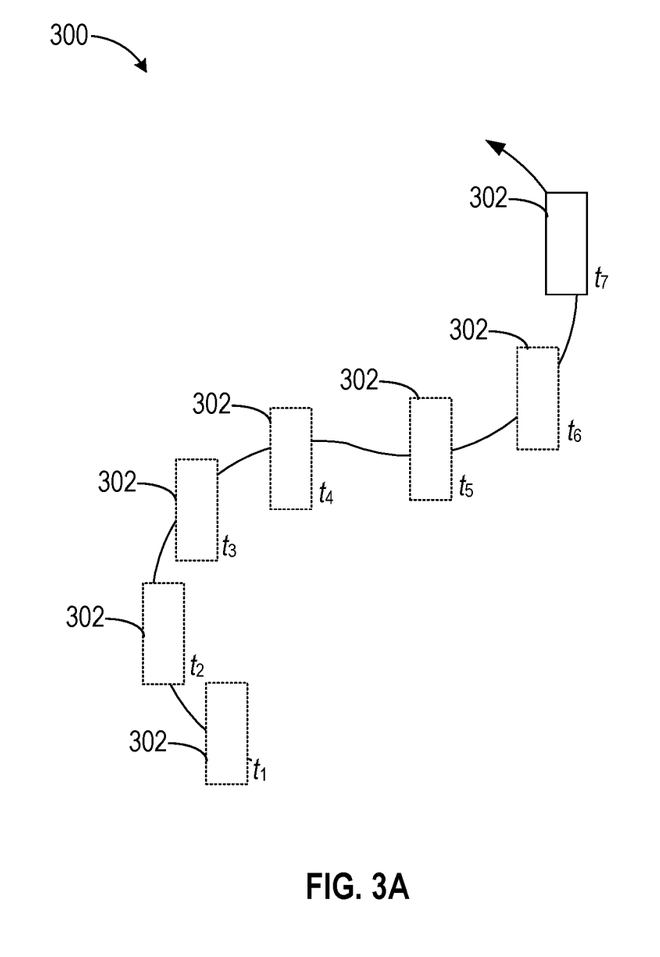
FIGS. 3A-3B are diagrams of an example implementation of a positioning system for paving machines described herein.

FIGS. 3A-3B are diagrams of an example implementation 300 of positioning system 200 described herein. As shown in FIG. 3A, positioning system 200 may use a geofence 302 that is non-circular (e.g., in a shape of a rectangle, another elongated polygon, an elongated ellipse, and/or the like) to track a loading queue relative to paving machine 202. As described in more detail further below, geofence 302 may be positioned based on a location of paving machine 202 at a given time (e.g., t1-t7). However, as demonstrated in FIG. 3A, merely positioning geofence 302 based the location of paving machine 202 may be insufficient to effectively detect supply machines 204 in a loading queue relative to paving machine 202. For example, in cases when a work path of paving machine 202 is curved and/or otherwise varies in direction, geofence 302 may not be aligned with the work path, and thereby unable to effectively detect supply, machines 204 that may be in the loading queue. Accordingly, positioning system 200 may further provide a mechanism by which geofence 302 can be oriented according to a heading of paving machine 202 (e.g., a direction of movement of paving machine 202, a direction relative to an axis of rotation of paving machine 202, and/or the like) and a travel speed of paving machine 202.

Figure 3B:
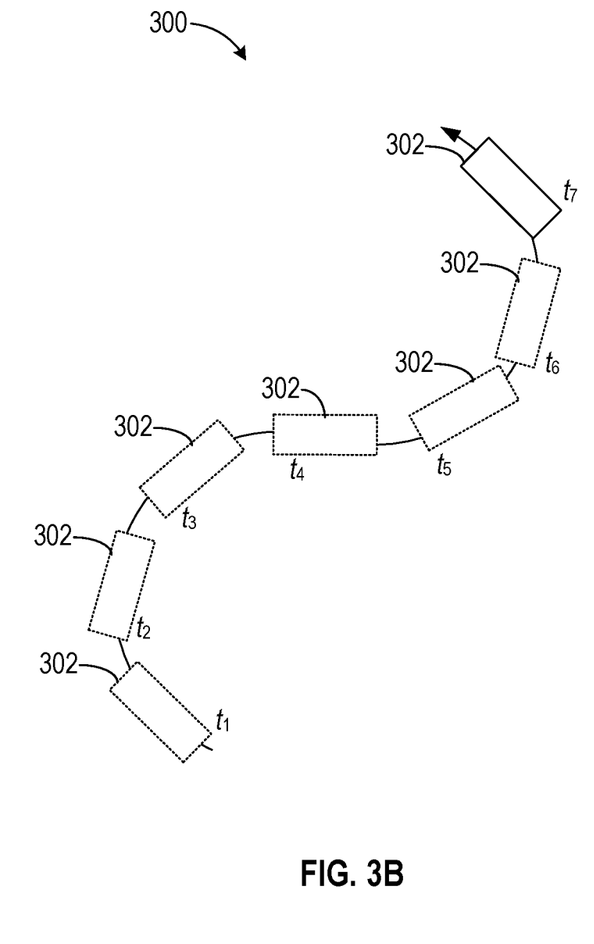

As shown in FIG. 3B, positioning system 200 may position geofence 302 based on the location of paving machine 202, and further, orient geofence 302 based on the heading of paving machine 202 and the travel speed of paving machine 202. As described in more detail further below, the heading of paving machine 202 may be derived based on a change in location of paving machine 202, a direction of movement of paving machine 202 relative to an axis of rotation of paving machine 202, and/or the like). In some examples, the heading of paving machine 202 may be determined based at least partially on the direction of the work path (e.g., if the direction of the work path is known to positioning system 200). The orientation of geofence 302 may be aligned according to the heading of paving machine 202 such that geofence 302 is aligned with the anticipated direction of the loading queue of supply machines 204 at a given time. In some examples, the travel speed of paving machine 202 may be determined based on a rate of change in the location of paving machine 202 and/or the like. Unlike the circular geofence 102 of prior art implementation 100 of FIG. 1, for instance, the non-circular geofence 302 described herein enables more, if not all, supply machines 204 in the loading queue to be detected by positioning system 200, and thereby enables more efficient management of a paving operation.

Figure 4A:
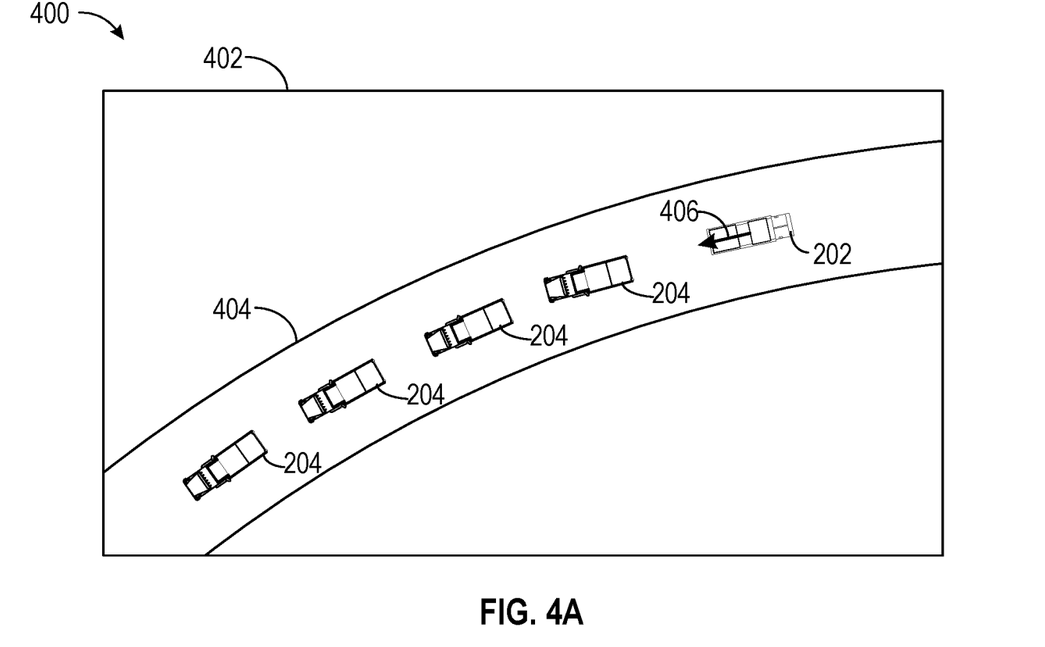
FIGS. 4A-4D are diagrams of an example implementation of a positioning system for paving machines described herein.

FIGS. 4A-4D are diagrams of an example implementation 400 of positioning system 200 described herein. As shown in FIG. 4A, and by reference number 402, paving machine 202 may be operated to pave along a work path 404 in a direction shown by arrow 406. Correspondingly, one or more supply machines 204 that are loaded with paving material may be aligned along a loading queue relative to paving machine 202. As shown for the example in FIG. 4A, supply machines 204 may be positioned relative to hopper assembly 220 of paving machine 202, and oriented in a manner that enables supply machines 204 to quickly refill the paving material of paving machine 202 as needed. In some examples, supply machines 204 may be coordinated to travel with and in proximity to paving machine 202 (e.g., in front of and maintaining a threshold distance from paving machine 202) so as to reduce downtime associated with transferring paving material to paving machine 202. When paving machine 202 begins to run low on paving material, first supply machine 204 of the loading queue (e.g., supply machine 204 nearest to paving machine 202) may be operated to unload paving material onto hopper assembly 220 of paving machine 202.

In some implementations, supply machines 204 may be operated to transfer paving material while paving machine 202 is stationary. In some examples, supply machines 204 may be operated to transfer paving material while paving machine 202 is in motion to further reduce downtime. An unloaded supply machine 204 may be operated to exit the loading queue, travel to a material production plant, retrieve more paving material, and return to an end of the loading queue. Meanwhile, next supply machine 204 of the loading queue (e.g., nearest to paving machine 202) may be operated to move with and in proximity to paving machine 202, and prepare to transfer paving material to paving machine 202 when needed. Paving machine 202 and/or supply machines 204 may continue operating in this manner until the paving operation is complete. An operator managing the paving operation may use positioning system 200 and/or a monitoring service provided by positioning system 200 to manage a rate of delivery of paving material provided by supply machines 204 (e.g., by managing a rate at which supply machines 204 retrieve paving material from the material production plant, a number of supply machines 204 that are deployed, and/or the like).

In one embodiment of the disclosed invention, a plurality of supply machines 204 may wait in the loading queue to unload paving material onto paving machine 202, wherein the head of each of the plurality of supply machines 204 may point in the direction away from the head of paving machine 202, and wherein the head and the tail of each of the plurality of supply machines 204 are positioned on the axis of rotation of the paving machine 202. Furthermore, except for the very first supply machine 204 in the loading queue (e.g., nearest to paving machine 202), head of a given supply machine 204 in the loading queue is behind the tail of the supply machine 204 in front of the given supply machine 204. Likewise, except for the very last supply machine 204 in the loading queue (e.g., farthest from paving machine 202), the head of the supply machine 204 behind the given supply machine 204 in the loading queue may be behind the tail of the given supply machine 204. Advantageously, and as described in more detail further below, the placement and the direction of a virtual non-circular (e.g., rectangular) geofence boundary may be configured to capture each of the plurality of supply machine 204 waiting in the loading queue.

Figure 4B:
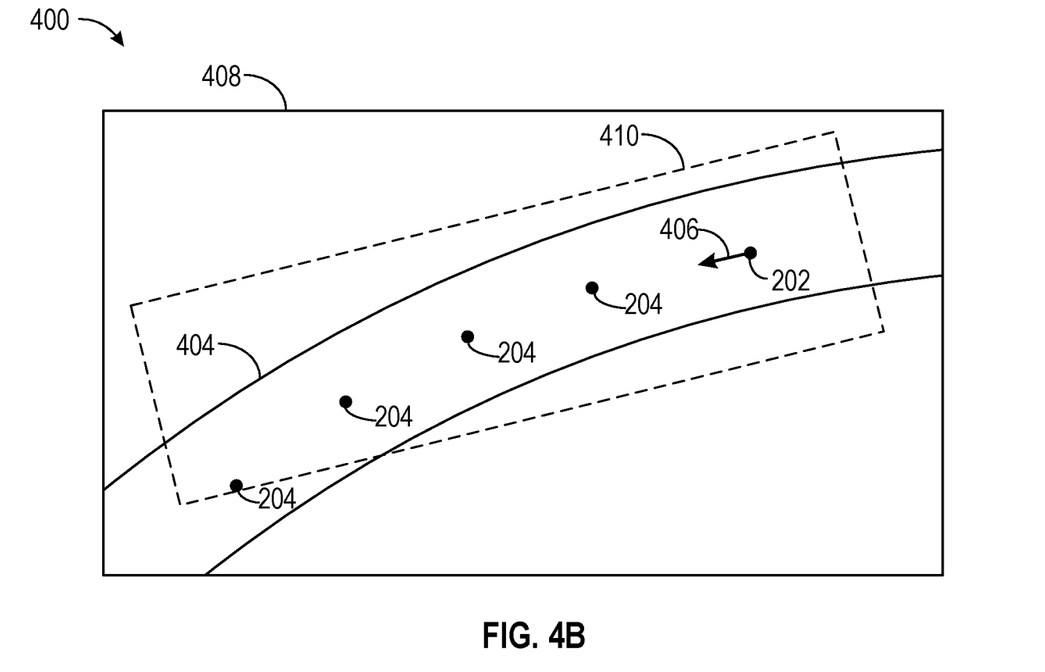

As shown in FIG. 4B, and by reference number 408, positioning system 200 (e.g., via control unit 226, management platform 206, and/or control station 208) may be configured to receive location data corresponding to a location of paving machine 202. For example, positioning system 200 may receive the location data of paving machine 202 via communication device 234 (e.g., via a GPS component, a GNSS component, an RF component, and/or the like) intermittently, periodically, and/or continuously in real-time. The location data may be received as geographical coordinates, a relative distance from a landmark of the worksite, a relative distance from supply machine 204 and/or another paving machine 202, and/or the like. In some examples, positioning system 200 may determine a heading of paving machine 202. For example, positioning system 200 may determine the heading based on a change in the location of paving machine 202 (e.g., based on a comparison between two or more consecutive entries of the location data). Positioning system 200 may define the heading of paving machine 202 in terms of a vector of geographical coordinates that indicates a travel direction of paving machine 202 (e.g., via a direction of arrow 406).

In some implementations, positioning system 200 may determine the heading of paving machine 202 based on the location of paving machine 202 and work path 404 of paving machine 202. For example, positioning system 200 may determine a direction of work path 404 based on a site plan associated with the worksite, determine the location of paving machine 202 relative to the work path 404 based on the location data, and determine the heading of paving machine 202 (e.g., based on an assumption that the heading of paving machine 202 is aligned with a direction of work path 404). In some examples, positioning system 200 may determine the heading of paving machine 202 using a sensing device (e.g., an accelerometer, a gyroscope, a magnetometer, an inertial measurement unit (IMU), and/or the like) that may be available on paving machine 202. Additionally, or alternatively, positioning system 200 may determine a travel speed of paving machine 202 (e.g., based on a rate of change in the location of paving machine 202, based on information provided by a sensing device, and/or the like). In such cases, the heading of paving machine 202 may indicate the travel speed of paving machine 202 (e.g., via a length of arrow 406).

As further shown in FIG. 4B, positioning system 200 may generate a virtual geofence 410 corresponding to an area of interest associated with paving machine 202 (e.g., an area corresponding to hopper assembly 220, the loading queue, and/or the like). Geofence 410 may include a set of geographical coordinates that define a non-circular boundary (e.g., a boundary in a shape of a rectangle, another elongated polygon, an elongated ellipse, and/or the like) around paving machine 202 and supply machines 204 in the loading queue. Geofence 410 may be configured to have an anchor point that is disposed at the location of paving machine 202, and extend from the anchor point in a direction that is based at least partially on the heading of paving machine 202. For example, geofence 410 may be virtually fixed to the anchor point, but allowed to rotate about the anchor point to align with the heading of paving machine 202, locations of one or more supply machines 204, a direction of work path 404, and/or the like. In some examples, a dimension of geofence 410 may be fixed and/or variable based on an attribute of paving machine 202, an attribute of supply machine 204, an attribute of work path 404, and/or the like.

In some implementations, positioning system 200 may generate geofence 410 with a dimension that is sufficient to detect supply machines 204 in the loading queue relative to paving machine 202. For example, a length and/or a width of geofence 410 may be defined based on a dimension of paving machine 202, a dimension of supply machine 204, a number of supply machines 204 in the loading queue, and/or the like. In some examples, geofence 410 may be configured with a variable position and/or dimension that adjusts based on a travel speed of paving machine 202, a composition of the paving material, a curing time of the paving material, an ambient temperature, a condition of work path 404, a configuration (e.g., a grade and/or another dimension) of work path 404, a distance between the material production plant and paving machine 202, and/or another factor that may affect the rate of delivery. In some examples, positioning system 200 may define the anchor point to be disposed off-center relative to a length of geofence 410 (e.g., located within one-half of the length of geofence 410, disposed approximately between 0-45% of the length of geofence 410, and/or the like). Additionally, or alternatively, positioning system 200 may define the anchor point to be disposed off-center relative to a width of geofence 410.

Figure 4C:
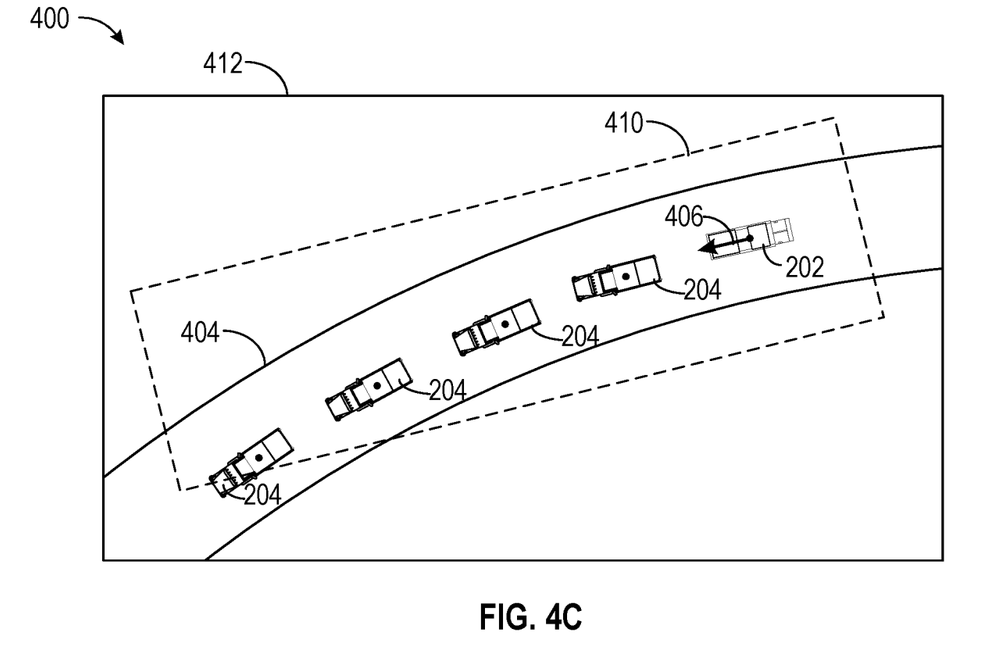

As shown in FIG. 4C, and by reference number 412, positioning system 200 may be configured to receive location data corresponding to a location of supply machine 204 relative to paving machine 202 and/or the worksite. For example, positioning system 200 may receive the location data of supply machine 204 via a GPS component, a GNSS component, an RF component, and/or another communication device that may be associated with supply machine 204 (e.g., via a communication device of supply machine 204, a communication device of a mobile device of an operator of supply machine 204, and/or the like). The location data of supply machine 204 may be received intermittently, periodically, and/or continuously in real-time. The location data of supply machine 204 may be received as geographical coordinates, a relative distance from a landmark of the worksite, a relative distance from paving machine 202 and/or another supply machine 204, and/or the like. In some examples, similar to as described above in connection with paving machine 202, positioning system 200 may determine a heading of supply machine 204 relative to paving machine 202 and/or the worksite.

In some implementations, positioning system 200 may determine a state of supply machine 204 based on a comparison between the location of supply machine 204 and geofence 410. For example, if supply machine 204 is determined to be within a boundary defined by geofence 410, positioning system 200 may determine that supply machine 204 is in the loading queue and available for supplying paving material to paving machine 202. If supply machine 204 is determined to be outside of the boundary defined by geofence 410, positioning system 200 may determine that supply machine 204 is not within the loading queue, unavailable to supply paving material to paving machine 202, traveling to a material production plant, returning from a material production plant, and/or the like. In some examples, positioning system 200 may determine the state of supply machine 204 based on when supply machine 204 enters or exits geofence 410. For example, positioning system 200 may determine that supply machine 204 has entered the loading queue and is available to supply paving material when supply machine 204 enters geofence 410, or determine that supply machine 204 has completed transferring paving material to paving machine 202 and is unloaded when supply machine 204 exits geofence 410.

Figure 4D:
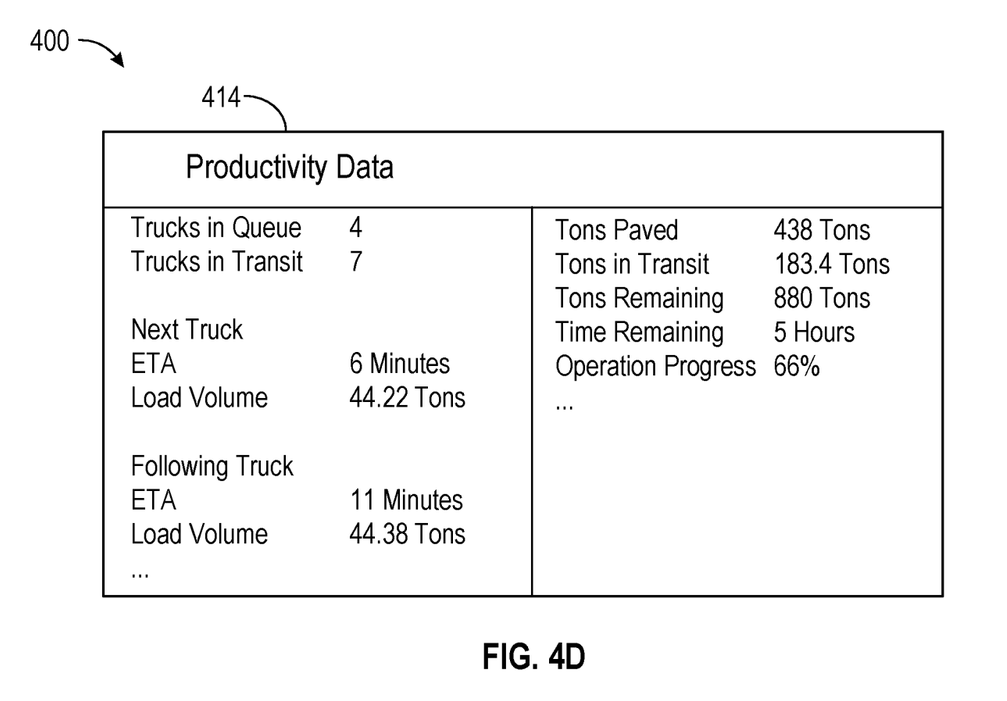

As shown in FIG. 4D, and by reference number 414, positioning system 200 may cause an action to be performed based on the state of supply machine 204. For example, positioning system 200 may generate productivity data (e.g., information relating to a progress of a paving operation at a worksite) based on the state of supply machine 204. Positioning system 200 may provide the productivity data as part of a monitoring service that is accessible to an operator of the worksite and/or another subscriber to the monitoring service. The productivity data may be made accessible to a local operator of paving machine 202 (e.g., via user interface 232 of control unit 226), a local operator of supply machine 204 (e.g., via a user interface that may be on-board supply machine 204 and/or a user interface of a mobile device of an operator of supply machine 204), and/or a remote operator (e.g., via user interface 246 of control station 208). The productivity data may enable an operator to manage a rate of delivery of paving material (e.g., manage a rate at which supply machines 204 retrieve paving material from the material production plant, a number of supply machines 204 that are deployed, and/or the like).

In some implementations, the productivity data may include a number of supply machines 204 in the loading queue relative to paving machine 202, a number of supply machines 204 that are in transit to the material production plant to retrieve paving material, an estimated time of arrival of supply machine 204 relative to paving machine 202 and/or the loading queue, a volume of paving material carried by supply machine 204, a total volume of paving material paved, a total volume of paving material in transit, a volume of paving material remaining, an estimated amount of time remaining in the paving operation, and/or other information relating to a progress of the paving operation. In some examples, the productivity data may be provided in a text format, in a visual format (e.g., via a progress bar, a graph, a table, an icon, and/or another visual annotation), in an audible format, and/or the like. In some examples, the productivity data may be provided as a digital overlay (e.g., a layer of annotations corresponding to the productivity data that may be superimposed on a digital image and/or a digital map of the worksite and/or the site plan). The productivity data may be updated intermittently, periodically, and/or continuously in real-time.

In some implementations, positioning system 200 may generate an event corresponding to the state of supply machine 204. For example, the event may include information relating to a time at which supply machine 204 entered geofence 410, a time at which supply machine 204 exited geofence 410, and/or the like. In some examples, the event may include productivity data generated based on the state of supply machine 204. Additionally, or alternatively, positioning system 200 may generate the event based on a change in the state of supply machine 204 and/or a change in the associated productivity data. The event may be stored (e.g., in memory 230 of control unit 226, memory 238 of management platform 206, memory 244 of control station 208, and/or network storage device 210) and made accessible to a local operator, a remote operator, and/or another subscriber to the monitoring service provided by positioning system 200. In some examples, positioning system 200 may generate a notification based on the state of supply machine 204, the associated event, and/or the associated productivity data. The notification may be communicated to a local operator, a remote operator, and/or another subscriber to the monitoring service.

In this way, and unlike the prior art, positioning system 200 may enable an operator to monitor a greater number of supply machines 204 relative to paving machine 202. Positioning system 200 may thereby enable more accurate determination of a rate of delivery of paving material to paving machine 202. For example, an operator may use the productivity data to determine whether the rate of delivery falls behind or exceeds a pace at which paving machine 202 is paving at a given moment. If the rate of delivery falls behind the pace of paving machine 202, an operator may deploy more supply machines 204, instruct operators of supply machines 204 to increase the rate of delivery, and/or the like. If the rate of delivery exceeds the pace of paving machine 202, an operator may dismiss supply machines 204, instruct operators of supply machines 204 to decrease the rate of delivery, and/or the like. In some examples, positioning system 200 may calculate the rate of delivery based on the productivity data, compare the rate of delivery to the pace of paving machine 202, and transmit automated notifications to operators of supply machines 204 to adjust the rate of delivery.

As indicated above, FIGS. 4A-4D are provided as an example. Other examples may differ from what is described in connection with FIGS. 4A-4D.

Figure 5:
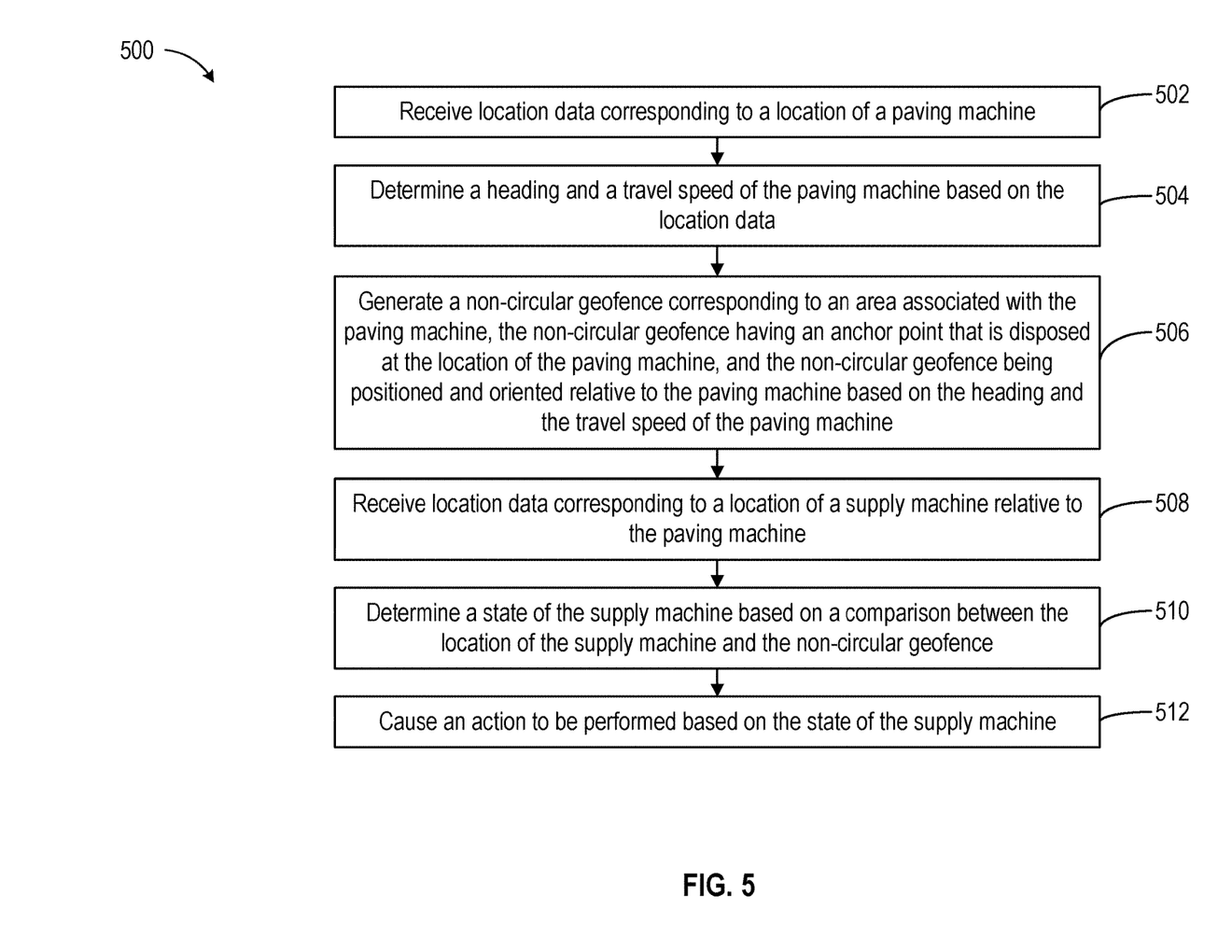
FIG. 5 is a flow chart of an example process for positioning paving machines.

FIG. 5 is a flow chart of an example process 500 for positioning paving machines. One or more process blocks of FIG. 5 may be performed by a management platform (e.g., management platform 206 of positioning system 200) and/or by another component or a group of components separate from or including the management platform (e.g., control unit 226 of paving machine 202, control station 208, network storage device 210, and/or another device of positioning system 200).

As shown in FIG. 5, process 500 may include receiving location data corresponding to a location of a paving machine (block 502). For example, the management platform (e.g., using processor 236, memory 238, communication device 240, and/or the like) may receive location data corresponding to a location of a paving machine, as described above.

As further shown in FIG. 5, process 500 may include determining a heading of the paving machine based on the location data (block 504). For example, the management platform (e.g., using processor 236, memory 238, communication device 240, and/or the like) may determine a heading of the paving machine based on the location data, as described above.

As further shown in FIG. 5, process 500 may include generating a non-circular geofence corresponding to an area associated with the paving machine, the non-circular geofence having an anchor point that is disposed at the location of the paving machine, and the non-circular geofence extending from the anchor point in a direction that is based on the heading of the paving machine (block 506). For example, the management platform (e.g., using processor 236, memory 238, communication device 240, and/or the like) may generate a non-circular geofence corresponding to an area associated with the paving machine, as described above. The non-circular geofence may have an anchor point that is disposed at the location of the paving machine. The non-circular geofence may extend from the anchor point in a direction that is based on the heading of the paving machine.

As further shown in FIG. 5, process 500 may include receiving location data corresponding to a location of a supply machine relative to the paving machine (block 508). For example, the management platform (e.g., using processor 236, memory 238, communication device 240, and/or the like) may receive location data corresponding to a location of a supply machine relative to the paving machine, as described above.

As further shown in FIG. 5, process 500 may include determining a state of the supply machine based on a comparison between the location of the supply machine and the non-circular geofence (block 510). For example, the management platform (e.g., using processor 236, memory 238, communication device 240, and/or the like) may determine a state of the supply machine based on a comparison between the location of the supply machine and the non-circular geofence, as described above.

As further shown in FIG. 5, process 500 may include causing an action to be performed based on the state of the supply machine (block 512). For example, the management platform (e.g., using processor 236, memory 238, communication device 240, and/or the like) may cause an action to be performed based on the state of the supply machine, as described above.

Process 500 may include variations and/or additional implementations to those described in connection with FIG. 5, such as any single implementation or any combination of implementations described elsewhere herein. Although FIG. 5 shows example blocks of process 500, in some examples, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

A positioning system described herein (e.g., positioning system 200) may be used to facilitate a paving operation. For example, the positioning system may provide a monitoring service that can be used by an operator of the paving operation (e.g., a site foreman, a site manager, a site supervisor, and/or the like) to track and manage the paving operation. The operator may access the monitoring service provided by the positioning system using a mobile device, a computer, and/or another client device via a web-based application, a native application, and/or another interface. Among other things, the operator may use the monitoring service to track a location of the paving machine within a worksite, track a location of supply machines relative to the paving machine, an associated jobsite, and/or an associated worksite, determine a rate of delivery of paving material being transported by the supply machines, manage the rate at which the supply machines fetch paving material from a material production plant, and/or manage the rate at which the supply machines deliver paving material to the paving machine. Moreover, the positioning system and/or the monitoring service may be used by the operator to ensure the rate of delivery of the paving material is optimal (e.g., not too slow so as to cause delays, and not too fast so as to cause premature curing of paving material in transit).

During the paving operation, the positioning system may track a location of the paving machine (e.g., based on location data received from a positioning component of the paving machine). Based on the location data, the positioning system may determine a heading and a travel speed of the paving machine. The heading of the paving machine may be determined based on a change in location of the paving machine, a direction of movement relative to an axis of rotation of the paving machine, and/or the like. The travel speed of the paving machine may be determined based on a rate of change in location of the paving machine. In some examples, the heading and/or the travel speed of the paving machine may be determined based on one or more sensing devices that may be available on the paving machine (e.g., an accelerometer, a gyroscope, a magnetometer, an IMU, and/or the like). The positioning system may generate a non-circular geofence (e.g., a rectangular geofence) that is positioned and oriented relative to the paving machine based on the heading and the travel speed of the paving machine at a given time. Accordingly, unlike circular geofences of the prior art, the non-circular geofences described herein enable detection of a greater number of supply machines that are in a loading queue relative to the paving machine.

The positioning system further tracks the locations of the supply machines relative to the geofence to monitor supply machines that are entering, exiting, or waiting in a loading queue of the paving machine. In particular, if a supply machine enters the geofence, the positioning system triggers an event (e.g., a jobsite entry event, a worksite entry event, and/or the like) to notify the operator that the supply machine has entered the loading queue and is waiting to unload fresh paving material. If a supply machine exits the geofence, the positioning system triggers an event (e.g., a jobsite exit event, a worksite exit event, and/or the like) to notify the operator that the supply machine has exited the loading queue and is in transit to the material production plant to fetch more paving material. Based on the events identified by the positioning system and/or the monitoring service, the operator may be able to assess the rate of delivery, compare the rate of delivery with a productivity rate of the paving machine, and adjust the rate of delivery as needed. In some examples, the positioning system and/or the monitoring service may autonomously or semi-autonomously analyze and manage the rate of delivery for the operator.

Accordingly, and unlike in prior art embodiments, the positioning system described herein provides a greater volume of reliable information and enables more accurate assessments of a paving operation. For example, by elongating and aligning a non-circular geofence based at least partially on a heading of a paving machine, the positioning system is able to more reliably identify a greater number of supply machines that are entering or leaving a loading queue of the paving machine. By providing a more accurate account of supply machines in the loading queue, the positioning system is able to provide more accurate assessments relating to a rate of delivery of paving material. In addition, by providing more accurate assessments of the paving operation, the positioning system enables an operator to manage the paving operation more efficiently and conserve resources (e.g., fuel, electrical power, and/or other resources) that may otherwise be unnecessarily consumed. Furthermore, by providing more efficient paving operations, the positioning system enables operators to complete paving operations in less time, reduce unnecessary runtime and wear of paving machines and supply machines, and increase overall productivity.

What is claimed is:

1. A method, comprising:
   receiving, by a device, location data corresponding to a location of a paving machine;
   determining, by the device, a heading and a travel speed of the paving machine based on the location data;
   generating, by the device, a non-circular geofence with a length configured to detect supply machines in a loading queue relative to the paving machine,
      the non-circular geofence having an anchor point that is disposed at the location of the paving machine, and
      the non-circular geofence being positioned and oriented relative to the paving machine based on the heading and the travel speed of the paving machine; and
   detecting, by the device, a supply machine, of the supply machines, using the non-circular geofence.

2. The method of claim 1, wherein determining the heading of the paving machine comprises:

determining the heading of the paving machine based on a change in the location of the paving machine indicated by the location data.

3. The method of claim 1, wherein the non-circular geofence is aligned with one or more of the heading of the paving machine or a direction of a work path of the paving machine.

4. The method of claim 1, wherein the length is a variable length that adjusts based on the travel speed of the paving machine.

5. The method of claim 1, wherein detecting the supply machine comprises:
determining that the supply machine is in the loading queue and available for supplying paving material to the paving machine based on that the supply machine entered the non-circular geofence; or
determining that the supply machine has completed supplying paving material to the paving machine based on that the supply machine exited the non-circular geofence.

6. The method of claim 1, further comprising:
generating productivity data based on detecting the supply machine,
the productivity data including information relating to one or more of an estimated arrival time of the supply machine, an estimated unload time of the supply machine, an estimated wait time of the supply machine, an estimated volume of paving material paved, an estimated volume of paving material remaining, an estimated time of completion, or an estimated number of supply machines remaining.

7. The method of claim 1, wherein generating the non-circular geofence comprises:
generating the non-circular geofence based on one or more of a number of the supply machines in the loading queue or a dimension of the supply machine.

8. A device, comprising:
one or more memories; and
one or more processors, communicatively coupled to the one or more memories, configured to:
determine a location of a paving machine;
determine a heading of the paving machine;
generate a non-circular geofence corresponding to the paving machine based on one or more of a number of supply machines in a loading queue or a dimension of a supply machine of the supply machines,
the non-circular geofence having an anchor point that is disposed at the location of the paving machine, and
the non-circular geofence extending from the anchor point in a direction that is based on the heading of the paving machine; and
detect the supply machine based on the non-circular geofence,
wherein the one or more processors, when detecting the supply machine, are configured to:
determine that the supply machine is in the loading queue based on that the supply machine entered the non-circular geofence, or
determine that the supply machine has completed supplying material to the paving machine based on that the supply machine exited the non-circular geofence.

9. The device of claim 8, wherein the one or more processors are further configured to:
determine a travel speed of the paving machine; and
cause the non-circular geofence to be positioned and oriented based on the heading and the travel speed of the paving machine.

10. The device of claim 8, wherein the one or more processors, when determining the heading of the paving machine, are configured to:
determine the heading of the paving machine based on the location of the paving machine and a work path of the paving machine,
the work path being determined based on an associated site plan.

11. The device of claim 8, wherein the one or more processors, when generating the non-circular geofence, are configured to:
define a length of the non-circular geofence based on one or more of a length of the paving machine or a length of the supply machine; and
define the anchor point to be located within one-half of the length of the non-circular geofence.

12. The device of claim 8, wherein the one or more processors, when detecting the supply machine, are configured to:
determine that the supply machine is in the loading queue and available for supplying paving material to the paving machine based on that the supply machine entered the non-circular geofence.

13. The device of claim 8, wherein the one or more processors are further configured to:
generate, based on detecting the supply machine, one or more of an event or a notification corresponding to a state of the supply machine,
the state of the supply machine including information relating to one or more of a time the supply machine entered the non-circular geofence or a time the supply machine exited the non-circular geofence.

14. The device of claim 8, wherein the one or more processors are further configured to:
generate productivity data based on detecting the supply machine,
the productivity data including information relating to one or more of an estimated arrival time of the supply machine, an estimated unload time of the supply machine, an estimated wait time of the supply machine, an estimated volume of paving material paved, an estimated volume of paving material remaining, an estimated time of completion, or an estimated number of supply machines remaining.

15. A paving machine, comprising:
a frame;
a hopper assembly coupled to the frame; and
a control unit configured to:
determine a location of the paving machine,
determine a heading and a travel speed of the paving machine,
generate a non-circular geofence with a length configured to detect supply machines in a loading queue relative to the paving machine,
the non-circular geofence having an anchor point that is disposed at the location of the paving machine, and
the non-circular geofence being positioned and oriented relative to the paving machine based on the heading and the travel speed of the paving machine, and
detect a supply machine, of the supply machines, based on the non-circular geofence.

16. The paving machine of claim 15, wherein the non-circular geofence corresponds to an area associated with the hopper assembly.

17. The paving machine of claim 15, wherein the length is a variable length that adjusts based on the travel speed of the paving machine.

18. The paving machine of claim 15, wherein the control unit, when detecting the supply machine, is configured to:
   determine that the supply machine is in the loading queue and available for supplying paving material to the paving machine based on that the supply machine entered the non-circular geofence; or
   determine that the supply machine has completed supplying paving material to the paving machine based on that the supply machine exited the non-circular geofence.

19. The paving machine of claim 15, wherein the control unit is further configured to:
   generate, based on detecting the supply machine, one or more of an event or a notification corresponding to a state of the supply machine,
      the state of the supply machine including information relating to one or more of a time the supply machine entered the non-circular geofence or a time the supply machine exited the non-circular geofence.

20. The paving machine of claim 15, wherein the non-circular geofence is generated based on one or more of a number of the supply machines in the loading queue or a dimension of the supply machine.

* * * * *